United States Patent
Liu et al.

(10) Patent No.: US 9,219,363 B2
(45) Date of Patent: Dec. 22, 2015

(54) PHOTOVOLTAIC SYSTEM AND METHOD EMPLOYING A NUMBER OF MAXIMUM POWER POINT TRACKING MECHANISMS

(71) Applicant: EATON CORPORATION, Cleveland, OH (US)

(72) Inventors: Yu Liu, Fox Point, WI (US); Charles J. Luebke, Hartland, WI (US); Christopher S. Thompson, Kingston, RI (US)

(73) Assignee: EATON CORPORATION, Cleveland, OH (US)

( * ) Notice: Subject to any disclaimer, the term of this patent is extended or adjusted under 35 U.S.C. 154(b) by 430 days.

(21) Appl. No.: 13/858,420

(22) Filed: Apr. 8, 2013

(65) Prior Publication Data

US 2014/0062209 A1 Mar. 6, 2014

Related U.S. Application Data (60) Provisional application No. 61/697,533, filed on Sep. 6, 2012.

(51) Int. Cl.
| | |
|---|---|
| *H02J 1/10* | (2006.01) |
| *G05F 5/00* | (2006.01) |
| *H02J 3/38* | (2006.01) |

(52) U.S. Cl.
CPC . *H02J 1/102* (2013.01); *G05F 5/00* (2013.01); *H02J 3/385* (2013.01); *Y02E 10/58* (2013.01); *Y10T 307/707* (2015.04)

(58) Field of Classification Search
CPC ............. H02J 1/102; H02J 3/385; G05F 5/00; Y02E 10/58; Y10T 307/707
USPC .......................................................... 307/82
See application file for complete search history.

(56) References Cited

U.S. PATENT DOCUMENTS

| | | | |
|---|---|---|---|
| 8,139,382 B2 | 3/2012 | Zhang et al. | |
| 2009/0091956 A1* | 4/2009 | Nocentini et al. | 363/65 |
| 2009/0206666 A1 | 8/2009 | Sella et al. | |
| 2009/0284232 A1 | 11/2009 | Zhang et al. | |

(Continued)

OTHER PUBLICATIONS

European Patent Office, "International Search Report and Written Opinion", Oct. 22, 2013, 9 pp.

*Primary Examiner* — Rexford Barnie
*Assistant Examiner* — Toan Vu
(74) *Attorney, Agent, or Firm* — Eckert Seamans Cherin & Mellott, LLC; Philip E. Levy; Kirk D. Houser (57) ABSTRACT

A photovoltaic system includes a photovoltaic array and a DC/AC inverter. The photovoltaic array includes an output, a plurality of photovoltaic strings each including a plurality of photovoltaic modules electrically connected in series to form an output having a first direct current voltage, and a plurality of DC/DC converters each including a first maximum power point tracking mechanism for a corresponding one of the photovoltaic strings, an input of the output of the corresponding one of the photovoltaic strings, and an output having a second direct current voltage. Each output of the DC/DC converters is electrically connected in parallel or series to form the output of the photovoltaic array having a direct current voltage. The DC/AC inverter includes a second maximum power point tracking mechanism for the photovoltaic array, an input of the output of the photovoltaic array, and an output having an alternating current voltage.

22 Claims, 4 Drawing Sheets

(56) References Cited

U.S. PATENT DOCUMENTS

| | | |
|---|---|---|
| 2011/0160930 A1 | 6/2011 | Batten et al. |
| 2011/0276269 A1* | 11/2011 | Hummel .......................... 702/3 |
| 2012/0081937 A1* | 4/2012 | Phadke .......................... 363/95 |
| 2012/0205974 A1* | 8/2012 | McCaslin et al. ............... 307/18 |
| 2013/0016536 A1* | 1/2013 | Ehlmann et al. ................ 363/34 |
| 2013/0069438 A1* | 3/2013 | Liu et al. ........................ 307/82 |

* cited by examiner

PHOTOVOLTAIC SYSTEM AND METHOD EMPLOYING A NUMBER OF MAXIMUM POWER POINT TRACKING MECHANISMS

CROSS-REFERENCE TO RELATED APPLICATION

This application claims priority from and claims the benefit of U.S. Provisional Patent Application Ser. No. 61/697,533, filed Sep. 6, 2012, which is hereby incorporated by reference herein.

BACKGROUND

1. Field

The disclosed concept pertains generally to energy generating systems and, more particularly, to photovoltaic (PV) systems including PV string maximum power point tracking and PV inverter maximum power point tracking (MPPT). The disclosed concept further pertains to methods of providing MPPT.

2. Background Information

Renewable energy systems, such as photovoltaic (PV) systems, have been widely developed. A PV system includes a plurality of PV modules (e.g., without limitation, typically 200 to 300 W, 8 to 10 A short circuit current, and 30 to 50 VDC open-circuit voltage). Typically, 10 to 20 PV modules are electrically connected in series to form a PV string. In turn, plural PV strings are electrically connected in parallel to form a PV array.

A PV module has an optimal output direct current (DC) voltage under which the PV module can generate maximum power. If the PV modules in a PV string are exactly identical, then the optimal voltage of the PV string for maximizing string output power is the product of the common optimal voltage of the PV modules and the count of the PV modules in the PV string. If the PV strings in a PV array are exactly identical, then the optimal voltage of the PV array for maximizing array output power is the same as the common optimal voltage of the PV strings.

In operating a PV array, maximum power point tracking (MPPT) is generally used to automatically determine a voltage or current at which the array should operate to generate a maximum power output for a particular temperature and solar irradiance. Some PV systems provide a DC-DC converter for each PV module in the PV array. Each of these DC-DC converters performs MPPT to find a maximum power point for its corresponding PV module.

U.S. Pat. No. 8,139,382 discloses an energy generating system including local MPPT for each PV module and centralized MPPT for the entire PV array. The energy generating system comprises a plurality of energy generating devices (EGDs) comprising PV panels, each coupled to a corresponding local converter, that together form an energy generating array. A DC-AC converter coupled to the local converters is capable of receiving current and voltage from the local converters. Each local converter is capable of providing local MPPT for its corresponding PV panel. In this way, each panel may operate at its own maximum power point (MPP) under both ideal and mismatched or shaded conditions.

The energy generating system provides a system control loop for the entire system that is controlled by a central MPPT control block and a local control loop for each of the PV panels that is controlled by the corresponding local converter. The operating frequencies of these loops are spaced apart at least a predefined distance from each other in order to prevent system oscillations and to prevent the panels from operating away from their MPPs. For one embodiment, the system control loop is a closed-loop system that comprises the array, the central MPPT control block, and the DC-AC converter. In addition, each local control loop is a closed-loop system that comprises a panel and its corresponding local converter. For some embodiments, each local converter is designed such that the settling time of the local control loop for that converter is faster than a time constant for the system control loop. In a particular embodiment, the settling time of each local control loop is at least five times faster than the time constant of the system control loop.

U.S. Pat. No. 8,139,382 further discloses that the local converter comprises a power stage and a local controller, which further comprises an MPPT module and an optional communication interface. The power stage may comprise a DC-DC converter that is capable of receiving as inputs a panel voltage and current from the PV panel and reshaping the voltage-to-current relationship of the inputs to generate an output voltage and current. The communication interface of the local controller is capable of providing a communication channel between the local converter and a central array controller. However, for embodiments in which the local converter does not communicate with a central array controller, the communication interface may be omitted.

A simple configuration of a PV system includes a central PV inverter electrically connected to an entire PV array. The central PV inverter repetitively changes the output DC voltage of the PV array in order to track maximum power of the PV array (i.e., MPPT). However, due to a mismatch of PV modules and PV strings, the optimal voltages of the PV strings might not be the same as the optimal voltage of the PV array. Also, the optimal operating points of the individual PV modules are not the same due to mismatch.

In additional to the PV central inverter, various power electronic converters have been added into PV strings or PV modules in order to increase the freedom to search maximum power points for PV strings or PV modules. Table 1 shows four known different architectures of additional power electronic converters and their maximum power point searching capability.

TABLE 1

| Architecture | PV Array | PV String | PV Module |
|---|---|---|---|
| Eaton ® S-Max ™ | Central inverter provides MPPT searching for the entire PV array | | |
| Satcon ® Solstice ® | Central inverter maintains constant DC bus voltage | String DC-DC converter provides MPPT searching for the PV string | |
| National Semiconductor ® SolarMagic ™; or Tigo Energy ® Module Maximizer | Central inverter provides MPPT searching for the entire PV array | | Module DC-DC converter provides MPPT searching for individual PV modules |
| SolarEdge ® Power Optimizer | Central inverter maintains constant DC bus voltage | | Module DC-DC converter provides MPPT searching for individual PV modules |

Figure 1:
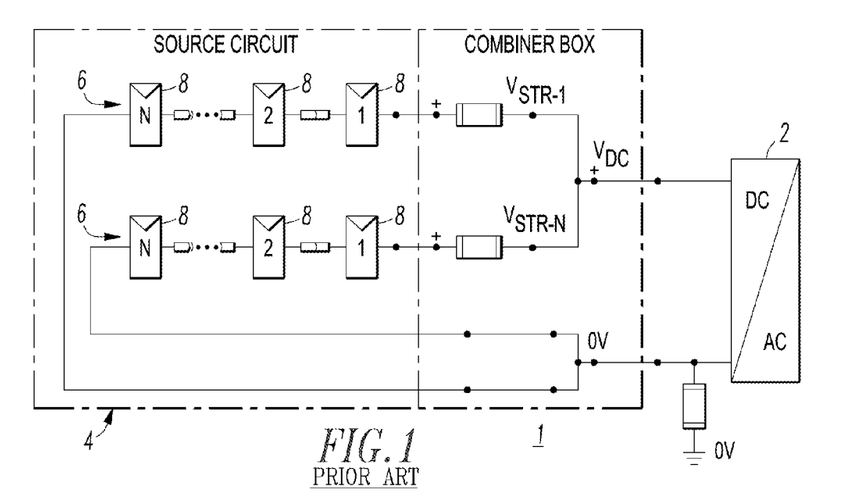
FIG. 1 is a block diagram of a PV system including a central PV inverter electrically connected to a PV array having a plurality of parallel PV strings, each with a plurality of series electrically connected PV modules.

FIG. 1 shows the first architecture of Table 1 for a PV system 1 including a central PV DC/AC inverter 2, which provides MPPT searching for entire PV array 4. The DC/AC inverter 2 keeps searching for the maximum power point (MPP) by changing the DC bus voltage, $V_{DC}$. In this architecture, the PV string voltages are equal to $V_{DC}$. The PV array 4 has a plurality of parallel PV strings 6, each with a plurality of series electrically connected PV modules 8.

There is room for improvement in PV systems.

There is also room for improvement in methods of providing maximum power point tracking.

SUMMARY

These needs and others are met by embodiments of the disclosed concept.

According to one aspect of the disclosed concept, a photovoltaic system comprises: a photovoltaic array comprising: an output, a plurality of photovoltaic strings, each of the photovoltaic strings comprising a plurality of photovoltaic modules electrically connected in series to form an output having a first direct current voltage, and a plurality of DC/DC converters, each of the DC/DC converters comprising a first maximum power point tracking mechanism for a corresponding one of the photovoltaic strings, an input of the output of the corresponding one of the photovoltaic strings, and an output having a second direct current voltage, wherein each such output of the DC/DC converters is electrically connected in parallel or series to form the output of the photovoltaic array having a direct current voltage; and a DC/AC inverter comprising a second maximum power point tracking mechanism for the photovoltaic array, an input of the output of the photovoltaic array, and an output having an alternating current voltage.

According to another aspect of the disclosed concept, a method of providing maximum power point tracking comprises: performing by a processor band-based maximum power point tracking in which an upper limit and a lower limit are applied to regulate a direct current voltage for a predetermined time period; and after the predetermined time period expires, defining by the processor a subsequent predetermined time period having a corresponding upper limit and a corresponding lower limit applied to regulate the direct current voltage.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

Figure 2:
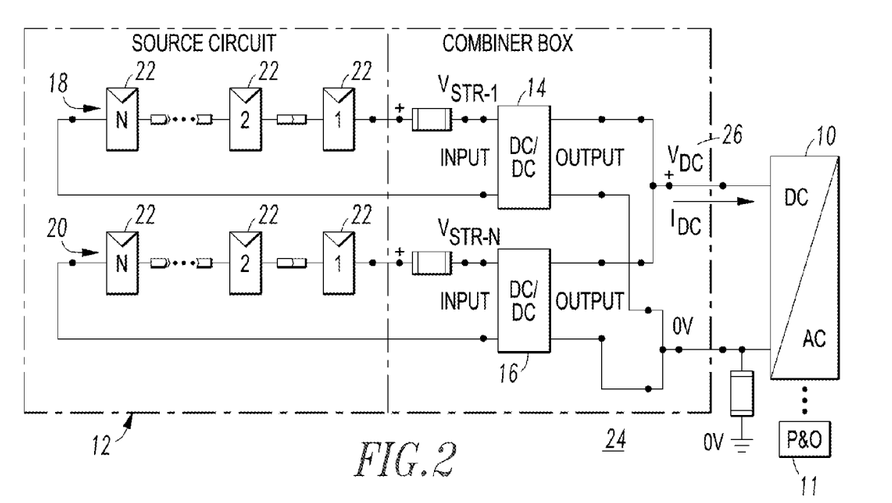
FIG. 2 is a block diagram of a PV system including a central PV inverter including maximum power point tracking (MPPT) searching for a PV array, and a number of PV string DC-DC converters, each employing MPPT searching for a corresponding individual PV string in accordance with embodiments of the disclosed concept.

Referring to FIG. 2, the disclosed concept employs a central photovoltaic (PV) DC/AC inverter 10 including maximum power point tracking (MPPT) searching for the entire PV array 12, and a plurality of PV string DC-DC converters 14,16, each employing MPPT searching for a corresponding individual PV string 18,20. In this multiple-tier MPPT architecture, the MPPT searching by the central PV inverter 10 and the MPPT searching by the PV string DC-DC converters 14,16 (e.g., without limitation, PV string optimizers) work together but without communication therebetween. Also, as will be described below in connection with FIGS. 4-6, a band-based MPPT searching algorithm 100 for the PV string DC-DC converters 14,16 increases noise rejection with the relatively high update frequency of the MPPT searching by the PV string DC-DC converters 14,16.

Each output of the PV string DC-DC converters 14,16 is electrically connected in parallel or series, as appropriate, to form the output of the PV array 12 having a direct current voltage $V_{DC}$.

Figure 6:
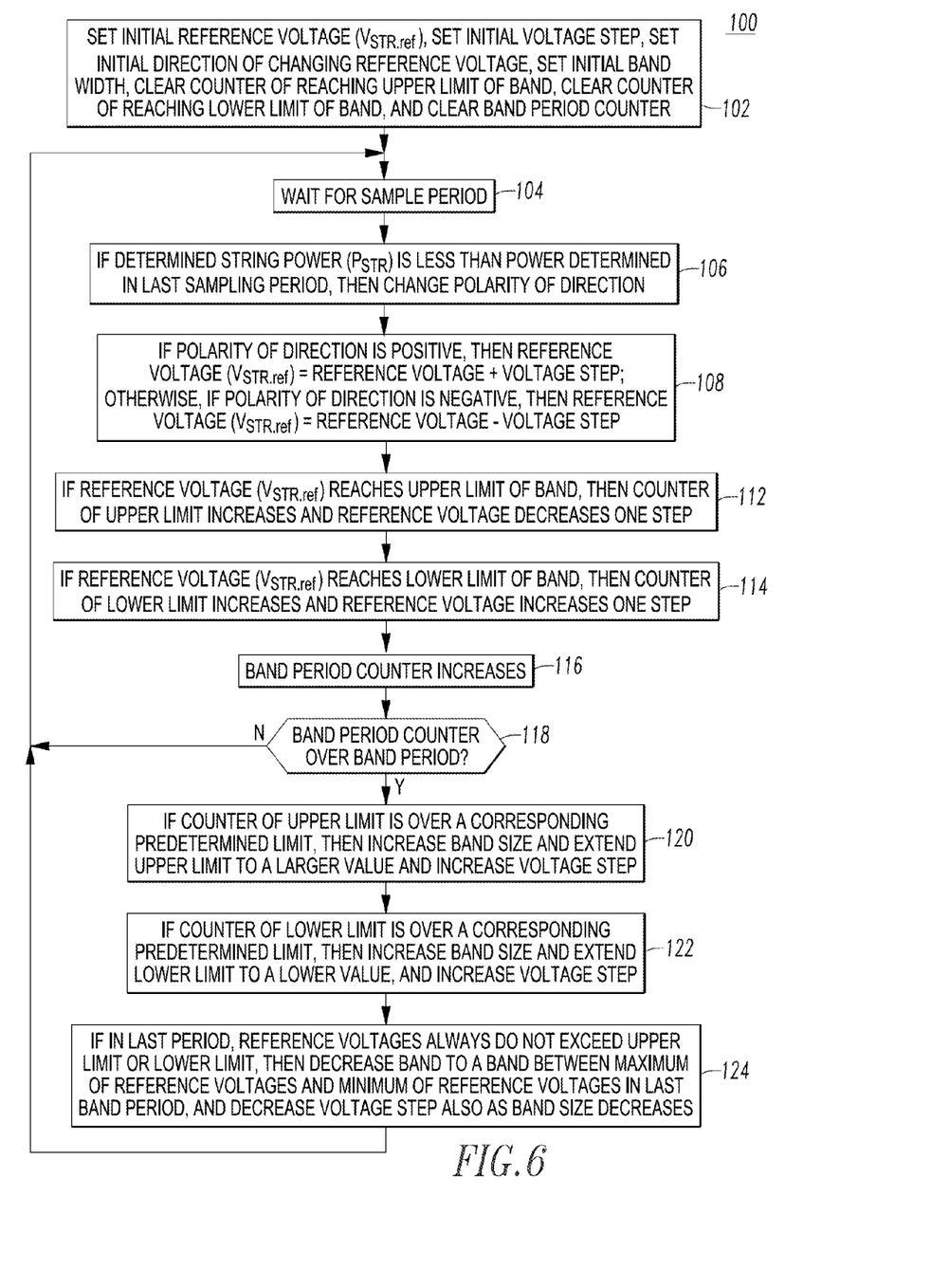
FIG. 6 is a flowchart of a band-based MPPT searching algorithm for the DC/DC converter of FIG. 2.

According to the disclosed concept, the central PV inverter 10 and the PV string DC-DC converters 14,16 of FIG. 2 each do MPPT searching at the same time. In order to avoid conflict between the MPPT searching by the central PV inverter 10 and the MPPT searching by the PV string DC-DC converters 14,16, the MPPT searching by the PV string DC-DC converters 14,16 is relatively much faster than the MPPT searching by the central PV inverter 10. However, the relatively fast speed of MPPT searching by the PV string DC-DC converters 14,16 makes the corresponding MPPT searching relatively sensitive to PV current fluctuation due to measurement noise and relatively quick solar irradiation changes to the PV modules 22. In order to make the MPPT searching by the PV string DC-DC converters 14,16 relatively fast and stable, the band-based MPPT searching algorithm 100 of FIG. 6 is employed.

In FIG. 2, the central PV inverter 10 does MPPT searching for the entire system 24 by regulating $V_{DC}$ 26, which is input by the central PV inverter (DC/AC) 10. Each of the individual DC/DC converters 14,16 also does MPPT searching for the corresponding PV string 18,20 by regulating the corresponding input voltage $V_{STR-1}$, $V_{STR-N}$ of the corresponding DC/DC converter 14,16, respectively.

The central PV inverter 10 can employ any suitable MPPT algorithm, such as for example and without limitation, perturbation and observation (P&O) 11. Each of the individual DC/DC converters 14,16 can also employ any suitable MPPT algorithm. Also, the MPPT algorithms employed by the central PV inverter 10 and the individual DC/DC converters 14,16 can be the same or different.

For example, P&O compares a current measurement of power with a previous measurement of power. Alternatively, any other suitable MPPT method or algorithm can be employed (e.g., without limitation, an MPPT algorithm employing a changing rate of power). The disclosed concept employs a band to limit voltage change as shown, for example and without limitation, in FIG. 4. Any suitable MPPT algorithm can be employed to trigger the actual voltage change.

The MPPT algorithm update frequency is the update frequency of output of the MPPT algorithm. Typically, the output of the MPPT algorithm is a voltage signal. The MPPT algorithm of the central PV inverter 10 has its output signal updated, for example and without limitation, at a frequency of about 0.1 Hz to about 2 Hz, generally. In other words, for this example, the output signal updates every about 500 ms to about 10 s. The MPPT algorithm of the individual DC/DC converters 14,16 preferably has a relatively much higher (e.g., greater than five times) update frequency than that of the central PV inverter 10. For example and without limitation, since these DC/DC converters 14,16 may be employed in combination with any suitable DC/AC PV inverter, the update frequency of the MPPT algorithm of the DC/DC converters 14,16 may be higher than 10 Hz (e.g., without limitation, 20 Hz).

Figure 3A:
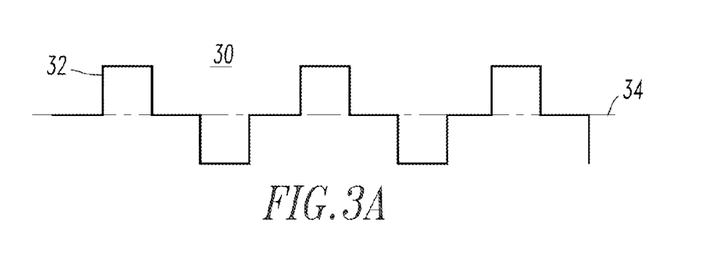
FIG. 3A is a plot of MPPT search voltage versus time for MPPT searching with constant solar irradiation.

Referring to FIG. 3A, a plot 30 of MPPT search voltage 32 versus time for MPPT searching with constant solar irradiation of PV modules is shown. Here, the MPPT search voltage 32 results oscillate around the optimal voltage 34.

Figure 3B:
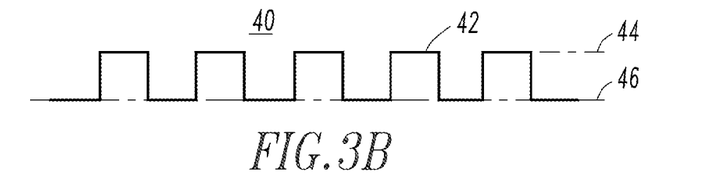
FIG. 3B is a plot of MPPT search voltage versus time for MPPT searching when solar irradiation is decreasing.

FIG. 3B shows a plot 40 of MPPT search voltage 42 versus time for MPPT searching when solar irradiation to PV modules is decreasing (e.g., without limitation, when clouds are moving in). The decreasing power output caused by the decreasing irradiation will force the MPPT searching direction to always change. The MPPT search voltage 42 results oscillate between two values 44,46, as shown.

Figure 3C:
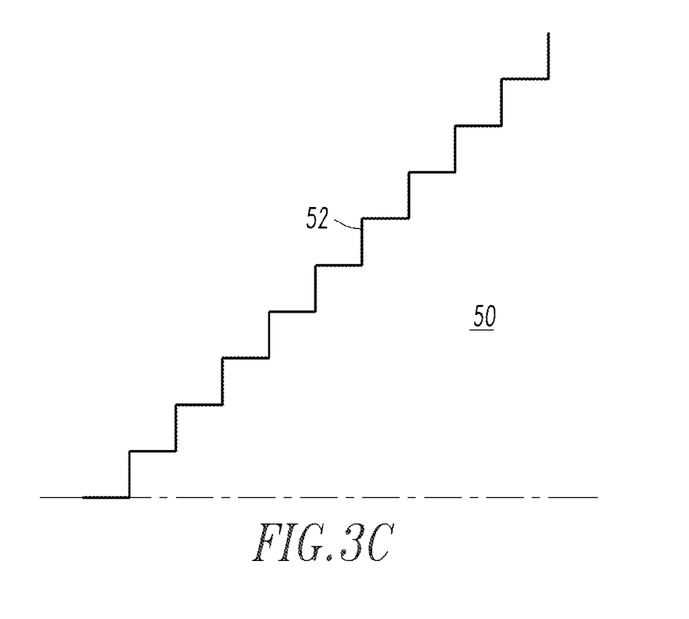
FIGS. 3C and 3D are plots of MPPT search voltage versus time for MPPT searching when solar irradiation is increasing.
Figure 3D:
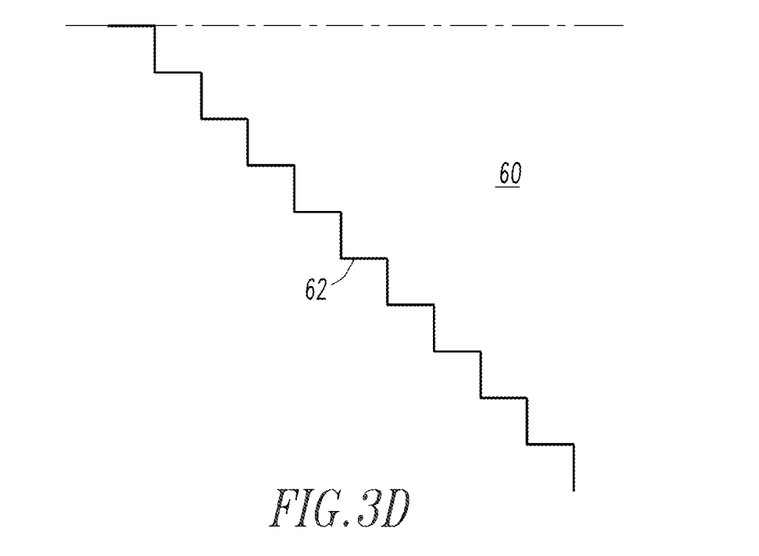

FIGS. 3C and 3D show two plots 50,60 of MPPT search voltage 52,62 versus time for MPPT searching when solar irradiation to PV modules is increasing. The increasing power caused by increasing irradiation will force the MPPT searching direction to be unchanged. The searching direction is randomly determined by the direction at the moment when the irradiation just begins to increase; hence, the resulting MPPT search voltage 52,62 can either increase (as shown in FIG. 3C) or decrease (as shown in FIG. 3D). Hence, a relatively quick increase of irradiation can result in a relatively large deviation between the MPPT search results and the true optimal voltage. Furthermore, even after irradiation becomes relatively stable, it can take relatively many MPPT searching intervals to search back to the optimal voltage. It is believed that known MPPT searching algorithms have tried to avoid this problem by employing a relatively long wait time (i.e., a relatively long updating time). Typically, a relatively quick irradiation change occurs within less than 1 second. Hence, if the MPPT algorithm updating period is about or larger than 1 second, then the relatively quick irradiation change will not affect the MPPT searching accuracy.

However, the MPPT algorithm for the individual DC-DC converters 14,16 of FIG. 2 needs to employ a relatively much shorter updating period (e.g., without limitation, about 50 ms). As a result, the MPPT searching can have relatively large errors during relatively rapid irradiation changes. The disclosed concept employs the example band-based MPPT searching algorithm 100 of FIG. 6 to make MPPT searching of the corresponding string DC-DC converter 14,16 relatively fast and stable.

Figure 4:
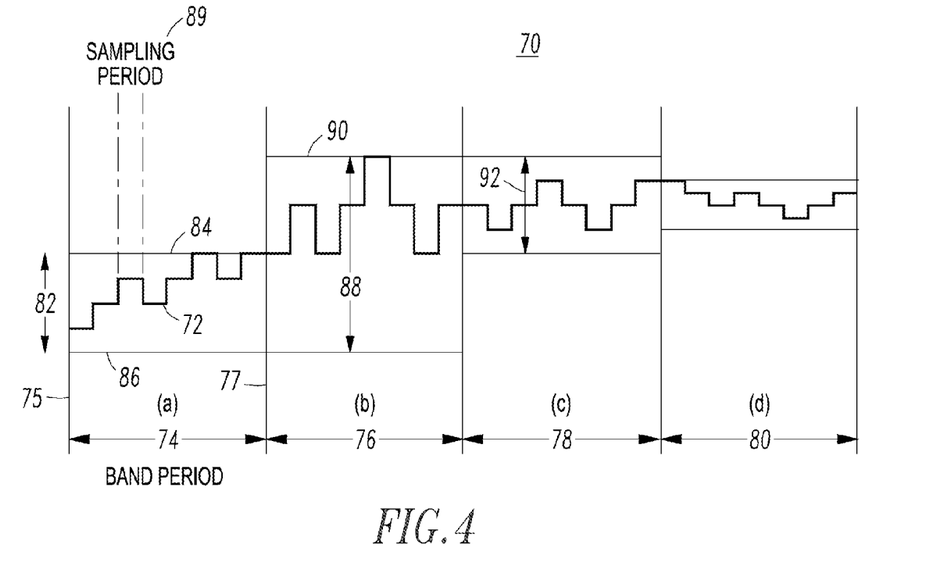
FIG. 4 is a plot of MPPT search voltage versus time for band-based MPPT searching in accordance with an embodiment of the disclosed concept.

FIG. 4 shows a plot 70 of example MPPT search voltage 72 versus time for the disclosed band-based MPPT searching algorithm 100 of FIG. 6. This employs a band (e.g., without limitation, a range of optimal voltages, such as 350 V to 400 V) within a predetermined time interval (e.g., without limitation, 600 mS; 1200 mS; any suitable time interval). In FIG. 4, there are four example time intervals: (a) 74, (b) 76, (c) 78 and (d) 80. A new band, such as 82, is determined at the beginning, such as 75, of each new predetermined time interval, such as 74, and the MPPT searching voltage 72 is limited to be within the band 82 for that time interval. If the MPPT searching voltage 72 reaches the upper limit 84 (or lower limit 86) of the band 82, then the upper limit (or lower limit) of the band would be extended for the next band 88 in the next predetermined time interval 76. At the same time, the voltage step of MPPT searching for each sampling period 89 might optionally also increase as shown in time interval (b) 76.

In this example, the MPPT searching voltage 72 reaches the upper limit 90 of the band 88 during time interval (b) 76, but does not stay there. As such, the band 92 shrinks in time interval (c) 78. However, it will be appreciated that various criteria can be used to determine if the band limit should be changed (e.g., without limitation, search voltage reaches limit; duration of search voltage at limit; number of times search voltage reaches limit; search voltage at limit at end of interval).

The transition from predetermined time interval (a) 74 to predetermined time interval (b) 76 is an example in which the upper limit 90 is extended and the MPPT searching voltage step increases. If the MPPT searching voltage 72 stabilizes, then the band 92 will shrink in next predetermined time interval 78 and the MPPT searching voltage step might optionally decrease. The transitions from predetermined time intervals (b) 76 to (c) 78, and from predetermined time intervals (c) 78 to (d) 80 are examples.

There might optionally be a minimum (or maximum) band size. If the band is trying to be smaller (or larger) than the minimum (or maximum) band size, then the band should keep the minimum (or maximum) band size.

There might optionally be a minimum (or maximum) MPPT searching voltage step. If the searching voltage step is trying to be smaller (or larger) than the minimum (or maximum) MPPT searching voltage step, then the step should keep the minimum (or maximum) step.

Figure 5:
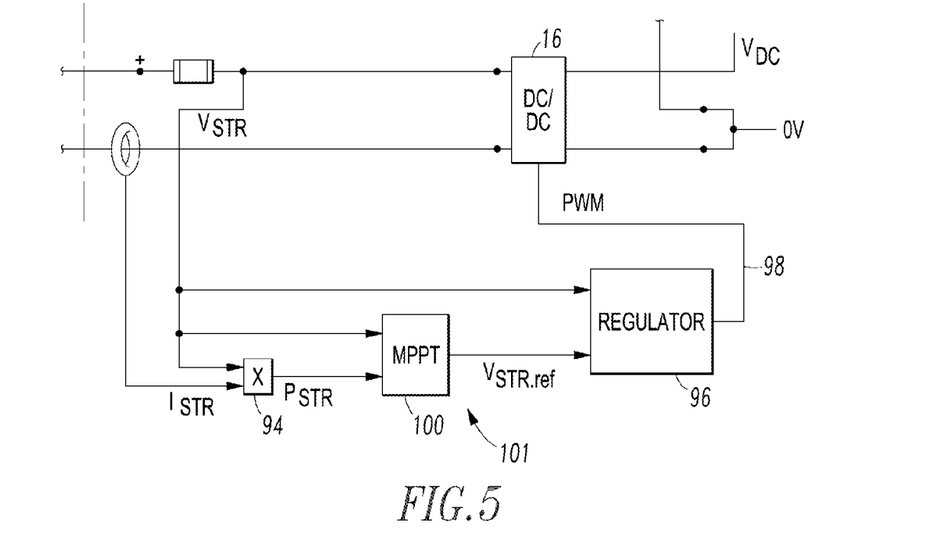
FIG. 5 is a block diagram including MPPT search and regulation of one of the DC/DC converters of FIG. 2.

FIG. 5 shows MPPT search and regulation of one 16 of the example DC/DC converters 14,16 of FIG. 2. The string voltage ($V_{STR}$) and the string current ($I_{STR}$) are multiplied at 94 to determine the string power ($P_{STR}$). The band-based MPPT searching algorithm 100, which will be explained in greater detail in connection with FIG. 6, inputs the string voltage ($V_{STR}$) and the string power ($P_{STR}$) and outputs a string voltage reference ($V_{STR.ref}$). The DC/DC regulator 96 inputs the string voltage ($V_{STR}$) and the string voltage reference ($V_{STR.ref}$) and outputs a pulse width modulated (PWM) signal 98 to control the DC/DC converter 16. It will be appreciated that the DC/DC converter 14 employs the same or similar MPPT search and regulation.

Although not shown in FIG. 2 or 5, the DC/AC inverter 10 of FIG. 2 can employ MPPT search and regulation in which PV array voltage ($V_{DC}$) and PV array current ($I_{DC}$) are multiplied to determine the PV array power ($P_{DC}$) (not shown). A suitable MPPT algorithm (e.g., without limitation, P&O 11) inputs the array voltage ($V_{DC}$) and the array power ($P_{DC}$) and outputs an array voltage reference ($V_{DC.ref}$) (not shown). A DC/AC regulator (not shown) inputs the array voltage ($V_{DC}$) and the array voltage reference ($V_{DC.ref}$) and outputs a pulse width modulated (PWM) signal (not shown) to control the DC/AC inverter 10.

FIG. 6 is a flowchart of the band-based MPPT searching algorithm 100 of FIG. 5. The algorithm 100 is implemented by a suitable processor 101. The processor 101 and the algorithm 100 provide a corresponding MPPT mechanism. First at 102, set the initial reference voltage ($V_{STR.ref}$), set the initial voltage step, set the initial direction of changing reference voltage, set the initial band width, clear the counter of reaching upper limit of band, clear the counter of reaching lower limit of band, and clear the band period counter.

Next, at 104, wait for the sample period. At 106, if the determined string power ($P_{STR}$) is less than the power determined in the last sampling period, then change the polarity of direction. Then, at 108, if the polarity of direction is positive, the reference voltage ($V_{STR.ref}$)=reference voltage+voltage step. Otherwise, if the polarity of direction is negative, then the reference voltage ($V_{STR.ref}$)=reference voltage−voltage step.

Next, at 112, if the reference voltage ($V_{STR.ref}$) reaches the upper limit of band, then the counter of upper limit increases and the reference voltage decreases one step. Then, at 114, if the reference voltage ($V_{STR.ref}$) reaches the lower limit of band, the counter of lower limit increases and the reference voltage increases one step.

Next, at 116, the band period counter increases. Then, at 118, if the band period counter is over the band period, update the band setting as follows: (1) at 120, if the counter of upper limit is over a corresponding predetermined limit, then increase (e.g., without limitation, double) the band size and extend the upper limit to a larger value (see, for example, the transition from period 74 to period 76 of FIG. 4) and increase (e.g., without limitation, double) the voltage step; (2) at 122, if the counter of lower limit is over a corresponding predetermined limit, then increase (e.g., without limitation, double) the band size and extend the lower limit to a lower value (not shown), and increase (e.g., without limitation, double) the voltage step; and (3) at 124, if in the last period, the reference voltages always do not exceed the upper limit or the lower limit, then decrease the band to a band between the maximum of the reference voltages and the minimum of the reference voltages in the last band period, and decrease the voltage step also as the band size decreases. After 124, or if the band counter was not over the band period at 118, then step 104 is repeated.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of providing maximum power point tracking, said method comprising:
    performing by a processor band-based maximum power point tracking in which an upper limit and a lower limit are applied to regulate a direct current voltage for a predetermined time period;
    determining that the direct current voltage reached the upper limit or the lower limit during the predetermined time period; and
    after the predetermined time period expires, defining by the processor a subsequent predetermined time period having a corresponding subsequent upper limit and a corresponding subsequent lower limit applied to regulate the direct current voltage, wherein the subsequent lower limit applied to regulate the direct current voltage was determined to reach the upper limit during the predetermined time period, and wherein the subsequent lower limit is less than the lower limit if the direct current voltage was determined to reach the lower limit during the predetermined time period.

2. The method of claim 1 further comprising:
    defining a voltage range with the upper limit and the lower limit from about 350 volts to about 400 volts; and
    defining a time range with the predetermined time period from about 600 milliseconds to about 1200 milliseconds.

3. A photovoltaic system comprising:
    a photovoltaic array comprising:
        an output,
        a plurality of photovoltaic strings, each of the photovoltaic strings comprising a plurality of photovoltaic modules electrically connected in series to form an output having a first direct current voltage, and
        a plurality of DC/DC converters, each of the DC/DC converters comprising a first maximum power point tracking mechanism for a corresponding one of the photovoltaic strings, an input of the output of the corresponding one of the photovoltaic strings, and an output having a second direct current voltage, wherein the first maximum power point tracking mechanism performs a band-based maximum power point tracking mechanism in which an upper limit and a lower limit are applied to regulate the output having the first direct current voltage of the corresponding one of the photovoltaic strings for a predetermined time period, wherein after the predetermined time period expires, each of the first maximum power point tracking mechanism of the of the DC/DC converters defines a subsequent predetermined time period having a corresponding upper limit and a corresponding lower limit and wherein the first maximum power point tracking mechanism is further structured to determine if the first direct current voltage of the corresponding one of the photovoltaic strings reached the upper limit or the lower limit during the predetermined time interval, and if so then to increase the corresponding upper limit or decrease the corresponding lower limit, respectively, for the subsequent predetermined time period;
    wherein each said output of DC/DC converters is electrically connected in parallel or series to form the output of said photovoltaic array having a direct current voltage, and
    a DC/AC inverter comprising a second maximum power point tracking mechanism for said photovoltaic array, an input of the output of said photovoltaic array, and an output having an altering current voltage.

4. The photovoltaic system of claim 3 wherein information is not communicated between the first and second maximum power point tracking mechanisms.

5. The photovoltaic system of claim 3 wherein the first and second maximum power point tracking mechanisms operate at the same time.

6. The photovoltaic system of claim 3 wherein the first maximum power point tracking mechanism operates faster than the second maximum power point tracking mechanism.

7. The photovoltaic system of claim 3 wherein the second maximum power point tracking mechanism regulates the direct current voltage of the output of said photovoltaic array.

8. The photovoltaic system of claim 3 wherein the first maximum power point tracking mechanism regulates the first direct current voltage of the output of the corresponding one of the photovoltaic strings.

9. The photovoltaic system of claim 3 wherein the second maximum power point tracking mechanism is a perturbation and observation mechanism.

10. The photovoltaic system of claim 3 wherein each of the first maximum power point tracking mechanism of the DC/DC converters employs the same maximum power point tracking algorithm as the second maximum power point tracking mechanism.

11. The photovoltaic system of claim 3 wherein each of the first maximum power point tracking mechanism of the DC/DC converters employs a different maximum power point tracking algorithm than the second maximum power point tracking mechanism.

12. The photovoltaic system of claim 3 wherein the second maximum power point tracking mechanism regulates the direct current voltage of the output of said photovoltaic array at a frequency of about 0.1 Hz to about 2 Hz.

13. The photovoltaic system of claim 3 wherein the first maximum power point tracking mechanism regulates the first direct current voltage of the output of the corresponding one of the photovoltaic strings at a frequency of greater than 10 Hz.

14. The photovoltaic system of claim 3 wherein the band-based maximum power point tracking mechanism is structured to function with constant irradiation to the photovoltaic modules.

15. The photovoltaic system of claim 3 wherein the band-based maximum power point tracking mechanism is structured to function with increasing or decreasing irradiation to the photovoltaic modules.

16. The photovoltaic system of claim 6 wherein the first maximum power point tracking mechanism regulates the first direct current voltage of the output of the corresponding one of the photovoltaic strings at a frequency of about 20 Hz.

17. The photovoltaic system of claim 3 wherein the upper limit and the lower limit define a voltage range from about 350 volts to about 400 volts; and wherein the predetermined time period defines a time range from about 600 milliseconds to about 1200 milliseconds.

18. The photovoltaic system of claim 3 wherein the first maximum power point tracking mechanism is further structured to change the first direct current voltage of the corresponding one of the photovoltaic strings by a predetermined voltage for a plurality of times during the predetermined time period, and to increase the predetermined voltage after the predetermined time period for the subsequent predetermined time period.

19. The photovoltaic system of claim 3 wherein the first maximum power point tracking mechanism is further structured to change the first direct current voltage of the corresponding one of the photovoltaic strings by a predetermined voltage for a plurality of times during the predetermined time period, and to decrease the predetermined voltage after the predetermined time period for the subsequent predetermined time period.

20. A photovoltaic system comprising:
a photovoltaic array comprising:
an output,
a plurality of photovoltaic strings, each of the photovoltaic strings comprising a plurality of photovoltaic modules electrically connected in series to form an output having a first direct current voltage and
a plurality of DC/DC converters, each of the DC/DC converters comprising a first maximum power point tracking mechanism for a corresponding one of the photovoltaic strings, an input of the output of the corresponding one of the photovoltaic strings, and an output having a second direct current voltage, wherein the first maximum power point tracking mechanism performs a band-based maximum power point tracking mechanism in which an upper limit and a lower limit are applied to regulate the output having the first direct current voltage of the corresponding one of the photovoltaic strings for a predetermined time period, wherein after the predetermined time period expires, each of the first maximum power point tracking mechanism of the DC/DC converters defines a subsequent predetermined time period having a corresponding upper limit and a corresponding lower limit, and wherein the first maximum power point tracking mechanism is further structured to determine if the first direct current voltage stabilized during the predetermined time interval, and if so then to decrease the corresponding upper limit and increase the corresponding lower limit, respectively, of the subsequent predetermined time period;
wherein each said output of the DC/DC converters is electrically connected in parallel or series to form the output of said photovoltaic array having a direct current voltage; and
a DC/AC inverter comprising a second maximum power point tracking mechanism for said photovoltaic array, an input of the output of said photovoltaic array, and an output having an altering current voltage.

21. The photovoltaic system of claim 20 wherein the first maximum power point tracking mechanism is further structured to limit the predetermined voltage to be less than or equal to a predetermined maximum value and to be greater than or equal to a predetermined minimum value.

22. The photovoltaic system of claim 3 wherein the first maximum power point tracking mechanism is further structured to limit a difference between the corresponding upper limit and the corresponding tower limit to be less than or equal to a predetermined maximum value and to be greater than or equal to a predetermined minimum value.

* * * * *